United States Patent
Guo (10) Patent No.: US 6,566,941 B2
(45) Date of Patent: May 20, 2003

(54) METHOD AND DEVICE OF PHASE DETECTION IN PHASE MODULATION SYSTEMS

(75) Inventor: Chun Lin Guo, Taichung (TW)

(73) Assignee: Syncomm Technology Corp., Taoyuan (TW)

( * ) Notice: Subject to any disclaimer, the term of this patent is extended or adjusted under 35 U.S.C. 154(b) by 93 days.

(21) Appl. No.: 09/928,371

(22) Filed: Aug. 14, 2001

(65) Prior Publication Data

US 2002/0149420 A1 Oct. 17, 2002

(30) Foreign Application Priority Data

Apr. 13, 2001 (TW) ........................................ 90108899 A (51) Int. Cl.[7] .............................................. H04L 27/22
(52) U.S. Cl. ........................ 329/304; 329/311; 329/313; 375/4; 375/298; 375/324
(58) Field of Search ................................ 375/324, 298; 329/304, 311, 313

(56) References Cited

U.S. PATENT DOCUMENTS

| | | | | |
|---|---|---|---|---|
| 3,825,737 A | * | 7/1974 | Croisier | 708/4 |
| 4,968,955 A | * | 11/1990 | Yoshida et al. | 329/304 |
| 5,117,440 A | * | 5/1992 | Smith et al. | 329/304 |
| 5,757,862 A | * | 5/1998 | Ishizu | 329/304 |
| 5,930,305 A | * | 7/1999 | Leib | 329/304 |

* cited by examiner

Primary Examiner—Michael Tokar
Assistant Examiner—Khai M. Nguyen
(74) Attorney, Agent, or Firm—Birch, Stewart, Kolasch & Birch, LLP (57) ABSTRACT

The invention discloses a phase detection method including a quadrant determining procedure, a first comparison procedure, a second comparison procedure, a coordinate transforming procedure, and a phase computing procedure. A first and a second phase approximate values are obtained in the quadrant determining procedure and the first comparison procedure. A third phase approximate value is obtained in the second comparison procedure and the coordinate transforming procedure. A total phase is computed in the phase computing procedure. Using this method, we does not need to consult look-up tables to determine the phase, thus saving a lot of memory space. The invention also provides a phase detection device.

18 Claims, 6 Drawing Sheets

| relative formulation | $\sin\alpha$ | $\cos\alpha$ | $X_1$ | $Y_1$ | $\alpha$ | PH3 |
|---|---|---|---|---|---|---|
| $(3/4) \leq (Y/X) < 1$ | (3/5) | (4/5) | $(4X+2Y+Y)/5$ | $(4Y-2X-X)/5$ | 36.87 | ≒ 105 |
| $(1/2) \leq (Y/X) < (3/4)$ | $(1/\sqrt{5})$ | $(2/\sqrt{5})$ | $(2X+Y)/\sqrt{5}$ | $(2Y-X)/\sqrt{5}$ | 26.57 | ≒ 76 |
| $(1/4) \leq (Y/X) < (1/2)$ | $(1/\sqrt{5})$ | $(4/\sqrt{17})$ | $(4X+Y)/\sqrt{7}$ | $(4Y-X)/\sqrt{17}$ | 14.04 | ≒ 40 |
| $(1/8) \leq (Y/X) < (1/4)$ | $(1/\sqrt{5})$ | $(8/\sqrt{65})$ | $(8X+Y)/\sqrt{65}$ | $(8Y-X)/\sqrt{65}$ | 7.13 | ≒ 20 |

Table 1

| relative formulation | $\sin\alpha$ | relative formulation | PH3 | relative formulation | PH3 |
|---|---|---|---|---|---|
| $(15/128) \leq (Y/X) < (16/128)$ | ≒ 20 | $(9/128) \leq (Y/X) < (10/128)$ | ≒ 12 | $(3/128) \leq (Y/X) < (4/128)$ | ≒ 4 |
| $(14/128) \leq (Y/X) < (15/128)$ | ≒ 18 | $(8/128) \leq (Y/X) < (9/128)$ | ≒ 11 | $(2/128) \leq (Y/X) < (3/128)$ | ≒ 3 |
| $(13/128) \leq (Y/X) < (14/128)$ | ≒ 17 | $(7/128) \leq (Y/X) < (8/128)$ | ≒ 10 | $(1/128) \leq (Y/X) < (2/128)$ | ≒ 2 |
| $(12/128) \leq (Y/X) < (13/128)$ | ≒ 16 | $(6/128) \leq (Y/X) < (7/128)$ | ≒ 8 | $0 \leq (Y/X) < (1/128)$ | ≒ 1 |
| $(11/128) \leq (Y/X) < (12/128)$ | ≒ 15 | $(5/128) \leq (Y/X) < (6/128)$ | ≒ 7 | $Y=0$ | 0 |
| $(10/128) \leq (Y/X) < (11/128)$ | ≒ 13 | $(4/128) \leq (Y/X) < (5/128)$ | ≒ 6 | | |

Table 2

1

METHOD AND DEVICE OF PHASE DETECTION IN PHASE MODULATION SYSTEMS

BACKGROUND OF THE INVENTION

1. Field of Invention

The invention relates to a phase detection method and its device and, in particular, to a phase detection method and its device used in phase modulation systems.

2. Related Art

Figure 1:
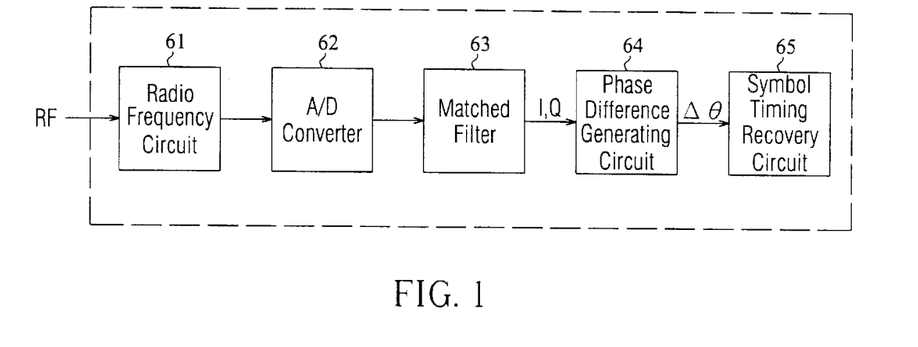
FIG. 1 is a block diagram of the components of a conventional phase demodulator.

In normal communications technologies, applications of phase demodulator are very common. They are often installed in phase modulation systems to convert a high-frequency signal into a digital signal. A conventional phase demodulator is shown in FIG. 1, containing a phase demodulator 6 of a symbol timing recovery circuit 65. As shown in the drawing, the phase demodulator 6 further includes a radio circuit 61, an A/D (Analog/Digital) converter 62, a matched filter 63, and a phase difference generating circuit 64.

The radio frequency circuit 61 receives an analog high-frequency signal and converts it into an analog intermediate-frequency (IF) signal. The analog IF signal is then converted by the A/D converter 62 and filtered by the matching filter 63 to generate an in-phase signal I and a quadrature signal Q. Generally speaking, the in-phase signal I and the quadrature signal Q are signed digital signals. The phase difference generating circuit 64 makes computations to obtain a phase difference from the in-phase signal I and the quadrature signal Q. The symbol timing recovery circuit 65 performs symbol timing recovery according to the phase difference output from the phase difference generating circuit 64.

Figure 2:
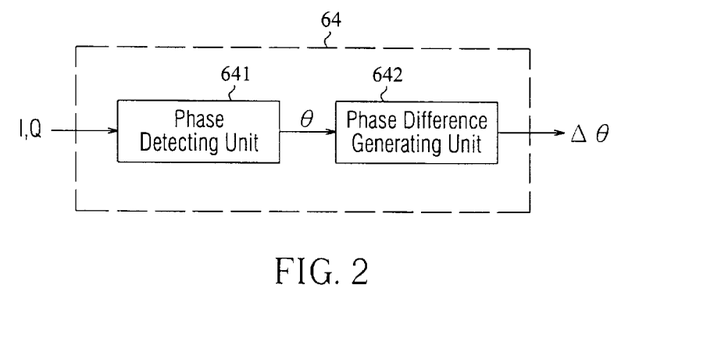
FIG. 2 is a constituent block diagram of the phase difference generating circuit in a conventional demodulator.

The phase difference generating circuit 64 generally contains a phase detecting unit 641 and a phase difference generating unit 642 (FIG. 2). The phase detecting unit 641 determines a phase θ according to the in-phase signal I and the quadrature signal Q. More concretely speaking, the phase detecting unit 641 usually uses a look-up table to determine the phase θ. The phase difference generating unit 642 uses the phase θ to obtain a phase difference Δθ for the symbol timing recovery circuit 65.

As described before, the phase detecting unit 641 of the phase difference generating circuit 64 obtain the phase θ by consulting a look-up table, therefore the correspondence between the phase θ and the signals I and Q have to be stored in a look-up table in the memory of a phase modulation system in advance. However, the correspondence look-up table of the θ and the signals I and Q normally occupies a lot of the memory so that the demodulator has more gate counts during the ASIC process. This is very inconvenient for communications devices with little memory (such as mobile phones) because the look-up table, thus lowering the efficiency of the memory, occupies a large portion of the memory. How to use other methods to obtain the phase without employing a large look-up table so that the demodulator can minimize its memory uses has become an important subject of the field.

SUMMARY OF THE INVENTION

In view of the foregoing problems, it is then an objective of the invention to provide a phase detection method and its device that can save a large amount of memory space.

The featured technique of the invention is to use an orthogonal coordinate system and a polar coordinate system to obtain the phase. Using the disclosed method, it is not necessary to employ a table to obtain the phase, thus saving a lot of memory space.

To achieve the above objective, the invention provides a phase detection device, which contains a quadrant determining module, a first comparison module, a second comparison module, a coordinate transforming module, and a phase computing module. The quadrant determining module and the first comparison module are used to obtain a first and a second phase approximate values. The second comparison module and the coordinate transforming module are used to obtain a third phase approximate value, with which the phase computing module calculates a total phase.

In addition, the invention also provides a phase detection method including a quadrant determining procedure, a first comparison procedure, a second comparison procedure, a coordinate transforming procedure, and a phase computing procedure. The quadrant determining procedure and the first comparison procedure obtain a first and a second phase approximate values. The second comparison procedure and the coordinate transforming procedure are used to obtain a third phase approximate value, with which the phase computing procedure calculates a total phase.

BRIEF DESCRIPTION OF THE DRAWINGS

The invention will become more fully understood from the detailed description given hereinbelow illustration only, and thus are not limitative of the present invention, and wherein.

TABLE 1 gives a set of correspondence relations of the coordinate ratio, the rotation angle and the third phase approximate value when n=1024; and TABLE 2 gives another set of correspondence relations of the coordinate ratio and the third phase approximate value when n=1024.

DETAILED DESCRIPTION OF THE INVENTION

Phase Detection Method

Figure 3:
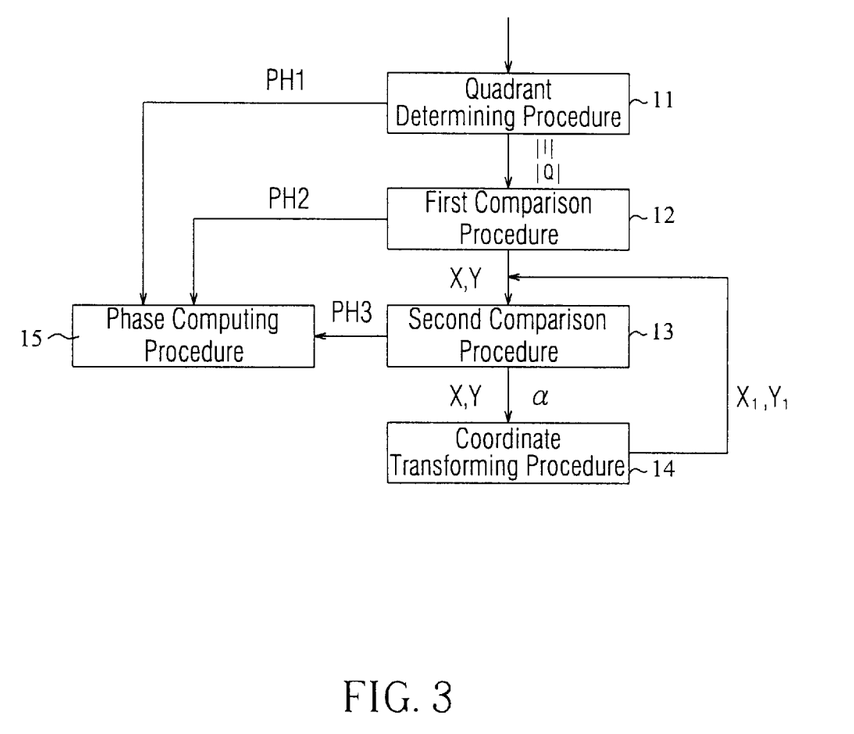
FIG. 3 is a flowchart of the disclosed phase detection method.
Figure 4:
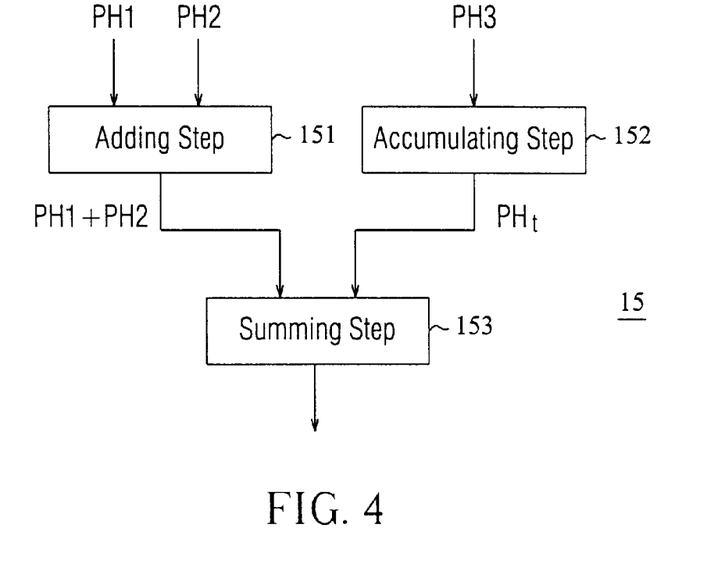
FIG. 4 shows the steps of the phase computing procedure in the disclosed phase detection method.
Figure 5:
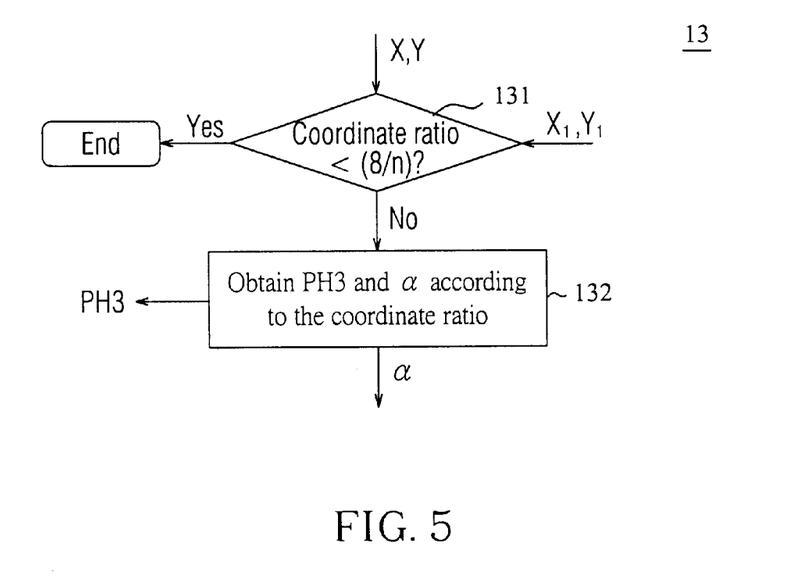
FIG. 5 shows the steps of the second comparison procedure in the disclosed phase detection method.

Please refer to FIGS. 3 to 5 for a concrete description of the disclosed phase detection method. Before a detailed description, it should be mentioned that the phase detection method is used in the phase detecting unit 641 shown in FIG. 2 to determine a phase θ. The phase detection device is used in a phase modulation system with a certain phase resolution n. In addition, in the current embodiment, the phase θ generated by the phase detection device ranges from 0 to 360 degrees and is expressed in binary digits. The phase detection method of the invention mainly uses an orthogonal coordinate system and a polar coordinate system to obtain the phase. The orthogonal coordinate system and the polar coordinate system are well known and thus omitted in the following description.

As shown in FIG. 3, the phase detection method includes a quadrant determining procedure 11, a first comparison procedure 12, a second comparison procedure 13, a coordinate transforming procedure 14, and a phase computing procedure 15.

Figure 8:
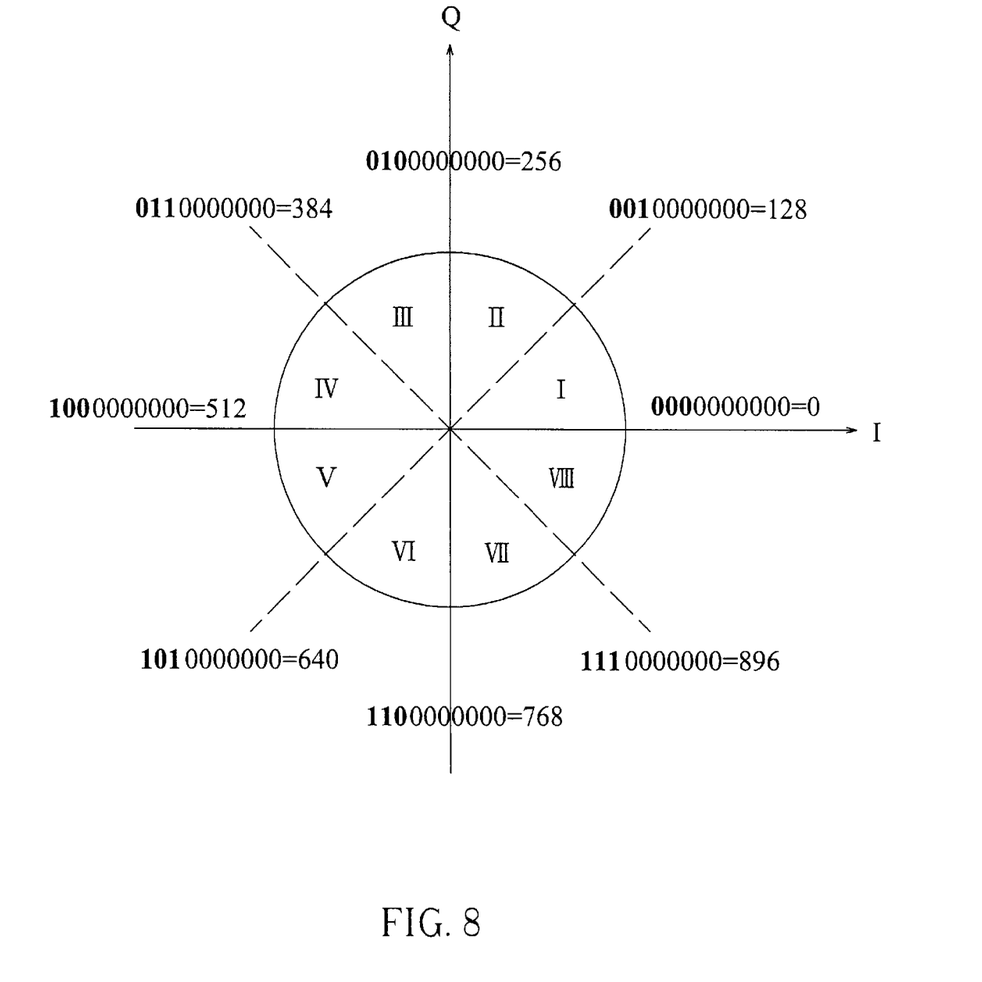
FIG. 8 illustrates the 10-bit phase θ ranging from 0 to 360 degrees in the I-Q orthogonal coordinate system.

In the quadrant determining procedure 11, the highest bits of an in-phase signal I and a quadrature signal Q of a signal are used to determine the quadrant where the coordinate of the signal is in an I-Q orthogonal coordinate system. A first phase approximate value PH1 is produced according to the determined quadrant. At the same time, the absolute values of the in-phase signal and the quadrature signals |I| and |Q| are computed. In the embodiment, if the determined quadrant is expressed by m, then the first phase approximate value is $(n/4) \times (m-1)$, where n and m are integers and n>0, $1 \leq m \leq 4$. In other words, in the quadrant determining procedure 11, the highest bits of the in-phase signal and the quadrature signal are used to determine which quadrant of the I-Q orthogonal coordinate system the signals I and Q are in. The phase $\theta$, ranging from 0 to 360 degrees, are expressed in terms of 10 bits. Therefore, when the phase resolution n=1204, PH1=0, 256, 512, or 768. As shown in FIG. 8, 10 bits are used to express the phase $\theta$ between 0 and 360 degrees in the I-Q orthogonal coordinate system. The coordinate of the in-phase signal I and the quadrature signal Q rests in one of the quadrants (1 through 4) in the I-Q orthogonal coordinate system. The quadrant determining procedure 11 determines PH1 and makes the first phase approximation.

In the first comparison procedure 12, the relative magnitudes of the absolute values of the in-phase signal I and the quadrature signal Q are used to generate a second phase approximate value PH2. The larger of them is taken as a first coordinate component and the smaller one as a second coordinate component. In the current embodiment, the first coordinate component and the second coordinate component are expressed as X and Y. When the absolute value of the in-phase signal is greater than the absolute value of the quadrature signal, the second phase approximate value is 0, i.e. PH2=0. This means that the coordinate of the in-phase signal I and the quadrature signal Q rests in area I of FIG. 8 after being rotated by a phase of PH1. On the contrary, if the absolute value of the in-phase signal is smaller than the absolute value of the quadrature signal, the second phase approximate value is n/8, i.e. PH2=n/8. This means that the coordinate of the in-phase signal I and the quadrature signal Q rests in area II of FIG. 8 after being rotated by a phase of PH1.

In the second comparison procedure 13, the coordinate (X,Y) (or $(X_1,Y_1)$) is used to get a coordinate ratio Y/X (or $Y_1/X_1$), with which a third phase approximate value PH3 is produced. A rotation angle $\alpha$ is generated at the same time. $(X_1,Y_1)$ represents the coordinate of the coordinate (X,Y) after the rotation by an angle $\alpha$. In particular, the third phase approximate value PH3 and the rotation angle $\alpha$ are generated according to the following method.

When $Y/X \geq 3/4$, PH3=n×(36.87/360) and the rotation angle $\alpha$=36.87 degrees. When the $3/4 \geq Y/X \geq 1/2$, PH3=n× (26.57/360) and the rotation angle $\alpha$=26.57 degrees. When the $1/2 \geq Y/X \geq 1/4$, PH3=n×(14.04/360) and the rotation angle $\alpha$=14.04 degrees. When the $1/4 \geq Y/X \geq 1/8$, PH3=n× (7.13/360) and the rotation angle $\alpha$=7.13 degrees. It should be emphasized that the reason why the rotation angle $\alpha$=36.87 degrees when $Y/X \geq 3/4$ is because 36.87 degrees is an angle in a rectangular triangle with the side ratio 3:4:5 for the coordinate ratio of 3/4. Other rotation angles $\alpha$ can be computed in the same way.

Furthermore, let p be an integer. When $(8/n)(p+1) \geq Y/X \geq (8/n)p$ with $3 \geq p \geq 0$, PH3=p+1. When $(8/n)(p+1) \geq Y/X \geq (8/n)p$ with $6 \geq p > 4$, PH3=p+2. When $(8/n)(p+1) \geq Y/X \geq (8/n)p$ with $10 \geq p \geq 7$, PH3=p+3. When $(8/n)(p+1) \geq Y/X \geq (8/n)p$ with $15 \geq p \geq 11$, PH3=p+4. It should be mentioned that this set of relations is used to obtain the phase approximate value within 7.13 degrees. The coordinate ratio inequalities are not fixed and can be properly modified according to the phase resolution n.

From the above described relations, one sees that when n=1024 the relations can be shown in TABLES 1 and 2. It should be mentioned that if the phase $\theta$ generated by the disclosed phase detection device is not expressed in terms of 10 bits, the value of phase resolution n also changes. The first phase approximate value PH1, the second phase approximate value PH2, the third phase approximate value PH3, and the coordinate ratio inequality within 7.13 degrees are also adjusted accordingly.

Furthermore, FIG. 5 shows the detailed steps of the second comparison procedure 13 in FIG. 3. As shown in the drawing, when the coordinate ratio Y/X (or $Y_1/X_1$) is smaller than 8/n, then the second comparison procedure 13 is stopped. Step 131 compares whether the coordinate ratio is smaller than 8/n. If the ratio is smaller than 8/n, then the operation of the second comparison procedure 13 is ceased; otherwise, step 132 is performed to obtain the third phase approximate value PH3 and the rotation angle $\alpha$. That is, each time step 132 is performed, a third phase approximate value PH3 and a rotation angle $\alpha$ are generated for the later phase computing procedure 15 to accumulate the third phase approximate values PH3.

As described before, the generation of the third phase approximate value PH3 and the rotation angle $\alpha$ makes use of the concept of rotations in the polar coordinate system. After the quadrant determining procedure 11 and the first comparison procedure 12, the phase of the in-phase signal I and the quadrature signal Q approximates and is limited to within 45 degrees. That is, the coordinate of the signals I and Q rests in area I of FIG. 8. Therefore, one can use the ratio and the coordinate rotation concepts to further approximate the true phase. In addition, since operations of, for example, 1/2, 1/4, and 1/8 only shift digits to the right by one, two, and three digits, respectively, in a digital circuit. Thus, the main comparison conditions are 3/4(1/2+1/4), 1/2, 1/4, 1/8, etc for the above coordinate ratio. The angles 36.87 degrees, 26.57 degrees, 14.04 degrees, and 7.13 degrees are the angles with tangents 3/4, 1/2, 1/4, and 1/8, respectively. Other angles can be similarly computed in this way.

In the coordinate transforming procedure 14, two coordinate components (X,Y) are converted into a third coordinate component and a fourth coordinate component using a rotation angle a and a set of specific functions. The third coordinate component and the fourth coordinate component are used to determine the second comparison procedure 13 should be performed again. More specifically, the third coordinate component and the fourth coordinate component are considered as the first coordinate component and the second coordinate component for the second comparison procedure 13. In the current embodiment, the third coordinate value and the fourth coordinate value are denoted by $X_1$ and $Y_1$. So, the explicit set of specific functions is:

$X_1 = X \cos \alpha + Y \sin \alpha$, and $Y_1 = Y \cos \alpha - X \sin \alpha$.

So, when $Y_1/X_1 > 8/n$, the second comparison procedure 13 is performed again.

In the phase computing procedure 15, the first phase approximate value PH1, the second phase approximate value PH2, and the third phase approximate PH3 are used to calculate the total phase PH of the in-phase signal and the quadrature signal. As shown in FIG. 4, the phase computing procedure 15 contains an adding step 151, an accumulating step 152, and a summing step 153. The adding step 151 adds the first phase approximate value PH1 and the second phase approximate value PH2. The accumulating step 152 accumulates the third phase approximate value PH3. In the embodiment, $PH_t$ denotes the accumulating value of PH3. The summing step 153 does the summation according to the second phase approximate value PH2 to output a total phase PH. When PH2=0, the summing step 153 performs the operation PH=PH1+PH2+$PH_t$. When PH2=n/8, the summing step 153 performs the operation PH=PH1+PH2+(n/8)−$PH_t$.

EXPLICIT EXAMPLE

In this example, the in-phase signal I and the quadrature signal Q are signed 12-bit signals and the phase resolution n=1024 (unsigned 10 bits, ranging from 0 to 1023). It should be stressed here that the in-phase signal I and the quadrature signal Q are values in base 10 for the convenience of explanation.

When (I, Q)=(−1000, −200), (I, Q) rests in the third quadrant of the I-Q orthogonal coordinate system; that is, m=3. Therefore, the first phase approximate value PH1=(n/4)×(m−1)=512. Since ABS(I)=1000>ABS(Q)=200, (X,Y)= (1000, 200) and PH2=0. Because (1/4)≧(200/1000)≧(1/8), PH3=n×(7.13/360)≈20 and α=7.13 degrees. At this moment, $PH_t$=20. According to the above transformation relations, one obtains $(X_1,Y_1)$=(1025,75). Since (10/128)≧(75/1025) ≧(9/128), i.e. p=9, thus PH3=9+3=12. At this moment, $PH_t$=20+12=32. As PH2=0, PH=512+0+32=544. Therefore, $PH_θ$=PH×(360/n)=544×(360/1024)≈191.25 degrees.

Through the present example, one sees that the disclosed phase detection method can readily use simple logic comparisons to calculate a phase of coordinate of the signals I and Q without using a look-up table as in the prior art. Thus, the invention can save a lot of memory space.

Phase Detection Device

Figure 6:
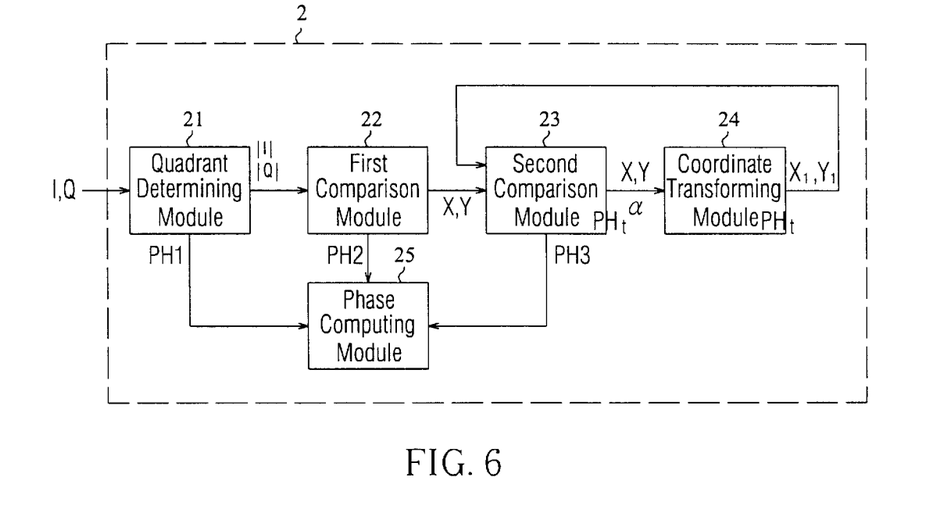
FIG. 6 is a constituent block diagram of the phase detection device according to a preferred embodiment of the invention.

As shown in FIG. 6, a preferred embodiment of the phase detection device 2 of the invention includes a quadrant determining module 21, a first comparison module 22, a second comparison module 23, a coordinate transforming module 24, and a phase computing module 25.

The quadrant determining module 21 receives an in-phase signal I and a quadrature signal Q and uses the highest bits of the in-phase signal I and the quadrature signal Q to determine which quadrant the signals belong to. A first phase approximate value PH1 is then generated according to the determined quadrant and their absolute values are output from the quadrant determining module 21. The generating method for the first phase approximate value PH1 has been described in the above-mentioned phase detection method and is not repeated here again.

The first comparison module 22 receives the absolute values of the in-phase signal and the quadrature signal output from the quadrant determining module 21 and generates a second phase approximate value PH2 according to the relative magnitudes of the signals. The larger absolute value is taken as a first coordinate component and the smaller absolute value as a second coordinate component. In the current embodiment, the first and second coordinate components are denoted by X and Y. The explicit generating method of the second phase approximate value PH2 is the same as that in the phase detection method disclosed before.

The second comparison module 23 receives two coordinate components (X,Y) or $(X_1,Y_1)$. The larger one of the two coordinate components is taken as the divisor and the other as dividend to obtain a coordinate ratio. A third phase approximate value PH3 and a rotation angle α are thus generated using the coordinate ratio. The explicit methods for generating the third phase approximate value PH3 and the rotation angle α have been described in the phase detection method and are not repeated again.

The coordinate transforming module 24 receives the two coordinate components (X,Y) and the rotation angle α output from the second comparison module 23. A set of specific functions is used to convert the coordinates into a third coordinate and a fourth coordinate. The third coordinate $X_1$ and the fourth coordinate $Y_1$ are fed into the second comparison module 23. Explicitly, the transforming functions are:

$X_1 = X \cos \alpha + Y \sin \alpha$, $Y_1 = Y \cos \alpha - X \sin \alpha$.

Figure 7:
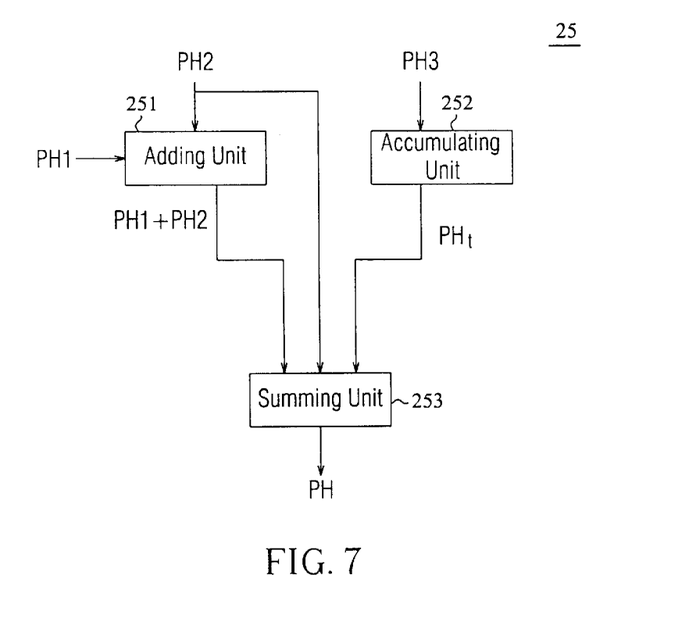
FIG. 7 is a constituent block diagram of the phase computing module according to a preferred embodiment of the invention.

The phase computing module 25 receives the first phase approximate value PH1, the second phase approximate value PH2, the third phase approximate value PH3 and uses the second approximate value PH2 to calculate the total phase of the in-phase signal and the quadrature signal. As shown in FIG. 7, the phase computing module 25 includes an adding unit 251, an accumulating unit 252, and a summing unit 253. The adding unit 251 adds up the first phase approximate value PH1 and the second phase approximate value PH2. The accumulating unit 252 accumulates the third phase approximate value PH3. In the current embodiment, $PH_t$ denotes the accumulating value of PH3. The summing unit 253 performs summation according to the second phase approximate value PH2 and outputs a total phase PH. The explicit computation of the total phase PH is as described in the phase detection method.

In conclusion, the disclosed phase detection device can readily use simple logic comparisons to calculate a phase of coordinate of the signals I and Q without using a look-up table as in the prior art. Thus, the invention can save a lot of memory space.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A phase detection device used in a phase demodulator with a certain phase resolution to calculate a phase using an in-phase signal and a quadrature signal generated by the phase demodulator, which phase detection device comprises:

a quadrant determining module, which receives the in-phase signal and the quadrature signal, uses the highest bits of the in-phase signal and the quadrature signal to determine which quadrant the signals belong to, generates a first phase approximate value according to the determined quadrant, and outputs the absolute values of the in-phase signal and the quadrature signal;

a first comparison module, which receives the absolute values of the in-phase signal and the quadrature signal output from the quadrant determining module, generates a second phase approximate value according to the relative magnitudes of the absolute values of the in-phase signal and the quadrature signal, and takes the one with a larger absolute value as a first coordinate component and the one with a smaller absolute value as a second coordinate component for further output;

a second comparison module, which receives the first and second coordinate components and takes the ratio of them with the larger component as the divisor to obtain a coordinate ratio, which is used to generate a third phase approximate value and a rotation angle;

a coordinate transforming module, which receives the first and second coordinate components and the rotation angle output from the second comparison module, converts the coordinate components into a third coordinate component and a fourth coordinate component using a set of specific functions, and outputs the third and fourth coordinate components to the second comparison module; and a phase computing module, which receives the first phase approximate value, the second phase approximate value, and the third phase approximate value, and uses the second phase approximate value to calculate a total phase of the in-phase signal and the quadrature signal.

2. The phase detection device of claim 1, wherein the phase detection device is a device with a phase resolution n, and if the determined quadrant is denoted by m, the first phase approximate value is $(n/4) \times (m-1)$, where n and m are integers and $n>0$, $1 \leq m \leq 4$.

3. The phase detection device of claim 1, wherein the set of specific functions are:

$$X_1 = X \cos \alpha + Y \sin \alpha, \text{ and}$$

$$Y_1 = Y \cos \alpha - X \sin \alpha,$$

where X and Y are the two coordinate components received by the coordinate transforming module and $X \geq Y$, $X_1$ and $Y_1$ are the third and fourth coordinate components, and $\alpha$ is the rotation angle output by the second comparison module.

4. The phase detection device of claim 1, wherein the phase computing module comprises an adding unit, an accumulating unit, and a summing unit, the adding unit adding the first phase approximate value PH1 and the second phase approximate value PH2, the accumulating unit accumulating the third phase approximate value PH3, the summing unit performing the summation according to the second phase approximate value PH2 to output a total phase PH, and if the accumulating value is denoted by $PH_t$, then $PH=PH1+PH2+PH_t$ when PH2=0 and $PH=PH1+PH2+(n/8)-PH_t$ when PH2=n/8.

5. The phase detection device of claim 2, wherein in the second comparison module, the third phase approximate value is $n \times (36.87/360)$ and the rotation angle $\alpha=36.87$ degrees when the coordinate ratio $\geq (3/4)$, the third phase approximate value is $n \times (26.57/360)$ and the rotation angle $\alpha=26.57$ degrees when $(3/4) \geq$ the coordinate ratio $\geq (1/2)$, the third phase approximate value is $n \times (14.04/360)$ and the rotation angle $\alpha=14.04$ degrees when $(1/2) \geq$ the coordinate ratio $\geq (1/4)$, and the third phase approximate value is $n \times (7.13/360)$ and the rotation angle $\alpha=7.13$ degrees when $(1/4) \geq$ the coordinate ratio $\geq (1/8)$.

6. The phase detection device of claim 2, wherein in the second comparison module, the third phase approximate value is (p+1) when $(8/n)(p+1) \geq$ the coordinate ratio $\geq (8/n)p$ and $0 \geq p \geq 3$, the third phase approximate value is (p+2) when $(8/n)(p+1) \geq$ the coordinate ratio $\geq (8/n)p$ and $6 \geq p \geq 4$, the third phase approximate value is (p+3) when $(8/n)(p+1) \geq$ the coordinate ratio $\geq (8/n)p$ and $10 \geq p \geq 7$, and the third phase approximate value is (p+4) when $(8/n)(p+1) \geq$ the coordinate ratio $\geq (8/n)p$ and $15 \geq p \geq 11$, where p is an integer.

7. The phase detection device of claim 2, wherein the second comparison module stops its operation when the coordinate ratio is smaller than 8/n.

8. The phase detection device of claim 2, wherein in the first comparison module, the second phase approximate value is 0 when the absolute value of the in-phase signal is greater than the absolute value of the quadrature value, and the second phase approximate value is n/8 when the absolute value of the in-phase signal is smaller than the absolute value of the quadrature value.

9. The phase detection device of claim 2, wherein n=1024.

10. A phase detection method used in a phase demodulator, which comprises:

a quadrant determining procedure, which uses the highest bits of an in-phase signal and a quadrature signal to determine which quadrant the signals belong to, generates a first phase approximate value according to the determined quadrant, and outputs the absolute values of the in-phase signal and the quadrature signal;

a first comparison procedure, which generates a second phase approximate value according to the relative magnitudes of the absolute values of the in-phase signal and the quadrature signal, and takes the one with a larger absolute value as a first coordinate component and the one with a smaller absolute value as a second coordinate component;

a second comparison procedure, which takes the ratio of the two coordinate components with the larger value as the divisor to obtain a coordinate ratio, which is used to generate a third phase approximate value and a rotation angle;

a coordinate transforming procedure, which converts the coordinate components into a third coordinate component and a fourth coordinate component using a set of specific functions, and repeats the second comparison procedure when the ratio of the third coordinate component and the fourth coordinate component is greater than a certain value; and a phase computing procedure, which uses the second phase approximate value to calculate a total phase of the in-phase signal and the quadrature signal.

11. The method of claim 10, wherein the method is used in phase detection device with a phase resolution n, and if the determined quadrant is denoted by m, the first phase approximate value is $(n/4) \times (m-1)$, where n and m are integers and $n>0$, $1 \leq m \leq 4$.

12. The method of claim 10, wherein the set of specific functions are:

$$X_1 = X \cos \alpha + Y \sin \alpha, \text{ and}$$

$$Y_1 = Y \cos \alpha - X \sin \alpha,$$

where X and Y are the two coordinate components received by the coordinate transforming module and $X \geq Y$, $X_1$ and $Y_1$ are the third and fourth coordinate components, and α is the rotation angle output by the second comparison module.

13. The method of claim 10, wherein the phase computing procedure comprises an adding step, an accumulating step, and a summing step, the adding step adding the first phase approximate value PH1 and the second phase approximate value PH2, the accumulating step accumulating the third phase approximate value PH3, the summing step performing the summation according to the second phase approximate value PH2 to output a total phase PH, and if the accumulating value is denoted by $PH_t$, then $PH=PH1+PH2+PH_t$ when PH2=0 and $PH=PH1+PH2+(n/8)-PH_t$ when PH2=n/8.

14. The method of claim 11, wherein in the second comparison procedure, the third phase approximate value is n×(36.87/360) and the rotation angle α=36.87 degrees when the coordinate ratio ≧(3/4), the third phase approximate value is n×(26.57/360) and the rotation angle α=26.57 degrees when (3/4)≧the coordinate ratio≧(1/2), the third phase approximate value is n×(14.04/360) and the rotation angle α=14.04 degrees when (1/2)≧the coordinate ratio≧(1/4), and the third phase approximate value is n×(7.13/360) and the rotation angle α=7.13 degrees when (1/4)≧the coordinate ratio≧(1/8).

15. The method of claim 11, wherein in the second comparison procedure, the third phase approximate value is (p+1) when (8/n)(p+1)≧the coordinate ratio≧(8/n)p and 0≧p≧3, the third phase approximate value is (p+2) when (8/n)(p+1)≧the coordinate ratio≧(8/n)p and 6≧p≧4, the third phase approximate value is (p+3) when (8/n)(p+1)≧the coordinate ratio≧(8/n)p and 10≧p≧7, and the third phase approximate value is (p+4) when (8/n)(p+1)≧the coordinate ratio≧(8/n)p and 15≧p≧11, where p is an integer.

16. The method of claim 11, wherein the second comparison procedure ends when the coordinate ratio is smaller than 8/n.

17. The method of claim 11, wherein in the first comparison procedure, the second phase approximate value is 0 when the absolute value of the in-phase signal is greater than the absolute value of the quadrature value, and the second phase approximate value is n/8 when the absolute value of the in-phase signal is smaller than the absolute value of the quadrature value.

18. The method of claim 11, wherein n=1024.

* * * * *